United States Patent
Zenchelsky et al.

(10) Patent No.: US 6,173,364 B1
(45) Date of Patent: Jan. 9, 2001

(54) SESSION CACHE AND RULE CACHING METHOD FOR A DYNAMIC FILTER

(75) Inventors: Daniel N. Zenchelsky; Partha P. Dutta, both of San Jose; Thomas B. London, Mountain View; Dalibor F. Vrsalovic, Sunnyvale, all of CA (US); Karl Andres Siil, Montgomery Township, Somerset County, NJ (US)

(73) Assignee: AT&T Corp., New York, NY (US)

( * ) Notice: Under 35 U.S.C. 154(b), the term of this patent shall be extended for 0 days.

(21) Appl. No.: 08/783,180

(22) Filed: Jan. 15, 1997

(51) Int. Cl.[7] .............................. G06F 12/00; G06F 13/00
(52) U.S. Cl. .............................. 711/118; 711/3; 711/133; 711/154
(58) Field of Search .................................... 711/133, 118, 711/129, 3, 119, 113, 144, 154

(56) References Cited

U.S. PATENT DOCUMENTS

| | | | |
|---|---|---|---|
| 5,274,631 | * 12/1993 | Bhardwaj ........................... | 370/60 |
| 5,515,376 | * 5/1996 | Murthy et al. ................... | 370/85.13 |
| 5,649,095 | * 7/1997 | Cozza ................................. | 711/113 |
| 5,668,809 | * 9/1997 | Rostoker et al. ................. | 370/392 |
| 5,781,549 | * 7/1998 | Dai ..................................... | 370/398 |
| 5,835,950 | * 11/1998 | Cho et al. .......................... | 711/144 |

* cited by examiner

Primary Examiner—Tuan V. Thai

(57) ABSTRACT

A cache for use with a network filter that receives, stores and ejects local rule bases dynamically. The cache stores a rule that was derived from a rule base in the filter. The cache rule is associated in the cache with a rule base indicator indicating from which rule base the cache rule was derived, and a rule base version number indicating the version of the rule base from which the cache rule was derived. When the filter receives a packet, the cache is searched for a rule applicable to a received packet. If no such rule is found, the filter rule base is found, and an applicable rule is carried out and copied to the cache along with a rule base indicator and version number. If a cache rule is found, it is implemented if its version number matches the version number of the rule base from which it was derived. Otherwise, the cache rule is deleted. The cache provides an efficient way of accurately implementing the rules of a dynamic rule base without having to search the entire rule base for each packet.

6 Claims, 2 Drawing Sheets

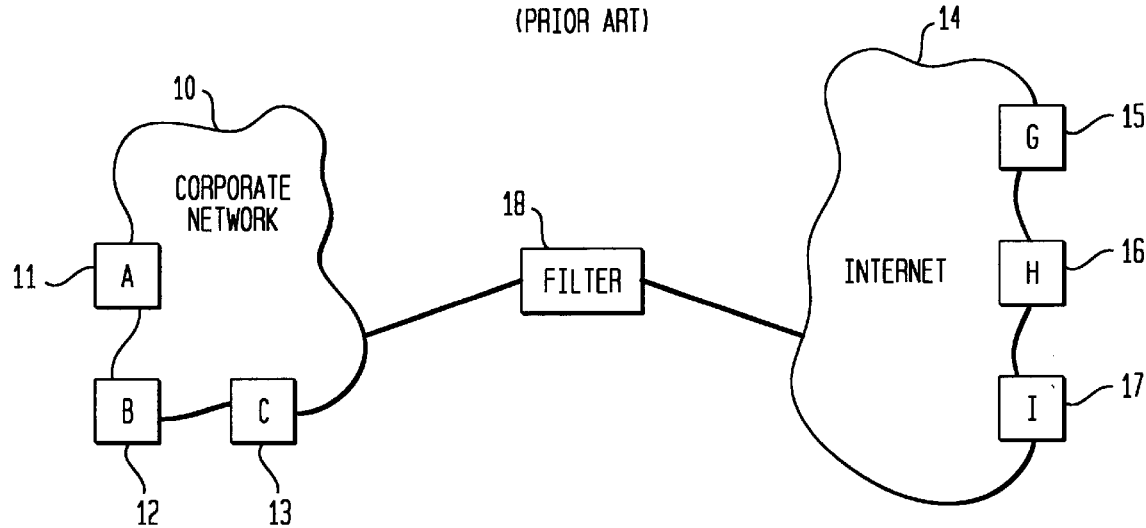

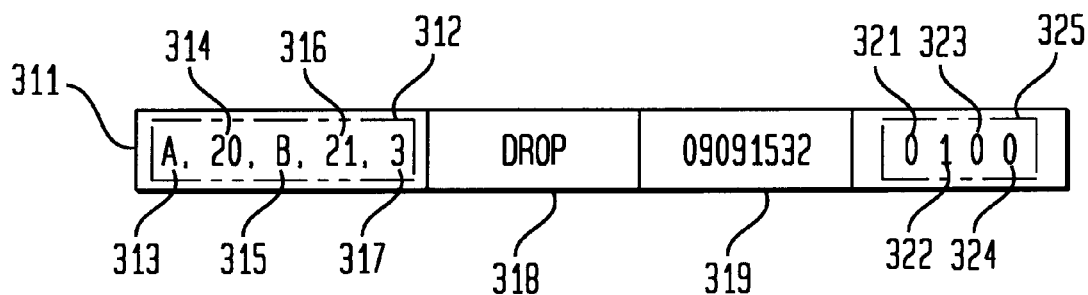

SESSION CACHE AND RULE CACHING METHOD FOR A DYNAMIC FILTER

FIELD OF THE INVENTION

This invention relates to information systems security, particularly to a dynamic filter whose local rule bases change frequently, and more particularly to a session rule cache that effectively eliminates redundant rule base searching in such a dynamic filter.

BACKGROUND OF THE INVENTION

A common information systems security measure that regulates the flow of information between two automated information systems (AIS) is a filter. Here, the term "AIS" refers to a computer, network of computers, internetwork of computers, or any subset thereof. A computer with a network address is known as a "host." A host may be a computer with either a fixed or temporary network address. A host with its own rules (known as a local rule base) for regulating the flow of information is called a "peer." Information on certain AIS flows in discrete quanta called "packets." Each packet on certain AIS has a header and a payload. The header comprises packet identification data. An example of packet identification data is a circuit identification number, which occurs in packets flowing in a circuit switched network. Another example of packet identification data is a 5-tuple consisting of a network source address and destination address, a source port and destination port, and a protocol identifier. The 5-tuple occurs in packets flowing in a connectionless packet switched network.

In accordance with the invention disclosed in co-pending application Ser. No. 08/785,501, entitled System and Method for Providing Peer Level Access Control on a Network, and filed on the same date as this application, a dynamic filter loads and stores a peer's local rule base when the peer is authenticated, and deletes (or "ejects") the rule base when the peer loses authentication. The filter is positioned between the peer and another AIS, such that packets that flow between the peer and the AIS pass through the filter. The filter receives a packet, and then searches for rules (usually in global and local rule bases) that that match the packet. A rule comprises a key and an action. The key identifies to which packets the rule applies, based upon the packet identification data of each packet. The action is generally either PASS or DROP, meaning that the packet is either forwarded to its intended destination, or else deleted. If a matching rule is found, the action prescribed by the matching rule is applied to the packet. One of the novel features of the dynamic filter is the ability to accommodate frequent changes in its local rule bases.

A filter in a typical setting is shown in FIG. 1. A corporate network 10 may wish to provide access for peers A 11, B 12 and C 13 to Internet 14, but may wish to limit the access that Internet hosts G 15, H 16 and I 17 have to the corporate network 10, which may contain trade secrets and proprietary information. The corporate network 10 places a filter 18 at the interface between the corporate network 10 and the Internet 14.

A filter operates on a packet by receiving a packet and searching for a rule whose key matches the identification data of the packet. If the received packet identification data matches the key of a rule, then the action of the rule is carried out on the packet.

In one embodiment, the filter stores rules that take the form of a 5-tuple, of similar structure to a packet's header, and an action, which is either PASS or DROP. The 5-tuple is advantageous to use because it allows the filter to distinguish packets not only based upon source and destination, but on the particular process with which the packet is involved. This is because several well-known processes (file transfer protocol, e-mail, etc.) use standard port numbers that are recognizable by the filter. Thus, in accordance with this embodiment, a filter may advantageously enforce a security policy which, for example, allows files to be transferred from host A to host B, but forbids the exchange of e-mail between the same two hosts.

An example of a rule base for corporate network 10 having peers A 11, B 12 and C 13, connected through filter 18 to the Internet 14 having hosts G 15, H 16 and I 17 is as follows:

| SOURCE Address,Port | DESTINATION Address, Port | PROTOCOL | ACTION |
| --- | --- | --- | --- |
| A,21 | G,32 | 4 | PASS |
| A,22 | H,19 | 3 | DROP |
| G,11 | A,64 | 4 | DROP |
| C,9 | I,23 | 4 | PASS |

This rule base is defined by the network system administrator in accordance with the security requirements of the hosts on the network.

When a packet arrives at the filter, the filter determines if the packet 5-tuple matches any rule 5-tuple. Here the rule 5-tuple is the rule key. If there is a match, the filter carries out the matching rule action, either PASS or DROP.

A filter generally has a default rule for transactions that are not explicitly specified in the rule base. Thus, if there are no matching rules in the rule base, the packet is compared to the default rule. If there is a match, then the default action is carried out, which is usually to DROP the packet. If there is no match to the default rule, then an error message is generated. In one embodiment the default rule may be structured so that all packets match the default rule so that no error message is ever generated.

By selectively passing and dropping packets between peers and hosts, the filter regulates the flow of information to and from AIS which are said to be "behind" or "protected by" the filter. In FIG. 1, the corporate network 10 is behind filter 18.

A traditional filter is only able to load and store rules through the intervention of a system administrator, a slow and cumbersome process. Indeed, the system administrator generally must hand-code rules in a format specific to the filter platform. These rules are based upon a security policy promulgated by the protected AIS. Hence, a traditional rule base is inflexible and cannot easily accommodate the changing security needs of the protected AIS.

This inflexibility often necessitates rule bases that are too broad for a given application. Without the possibility of easy updates, it is simpler to mandate global rules that apply to all AIS behind a filter rather than to load rules that apply to specific hosts. In such a case, all AIS behind the filter must conform to the most restrictive security requirements of any such AIS, resulting in overly restrictive filtering.

Even when rules are formulated to apply to individual hosts behind a firewall, such a level of access control may be insufficient. An example of this situation occurs for Internet Service Providers (ISP). An ISP has subscribers that are generally stand-alone personal computers having modems. The ISP has one or more hosts, each host connected to the Internet and having a pool of Internet Protocol (IP) addresses. When a subscriber dials-in to an ISP host (called a Point-of-Presence, or POP), the POP assigns the subscriber a temporary IP address from its pool of IP addresses. This temporary address generally corresponds to the calling subscriber only for a single session of connectivity. A future session is likely to result in another IP address being assigned to the subscriber.

This is problematic because rules are based in part upon network source and destination addresses. Thus, known filters cannot effectively control access to subscribers because their IP addresses change on a session by session basis.

The dynamic filter disclosed in co-pending application Ser. No. 08/785,501, entitled System and Method for Providing Peer Level Access Control on a Network, and filed on the same date as this application, remedies this deficiency by providing a system and method by which a subscriber's rules may be dynamically loaded into the filter when the host is authenticated, and ejected when the host is no longer authenticated. While the rules are stored in the dynamic filter, the rules correspond to the subscriber's temporary IP address, and thus can be effectuated.

The dynamic filter has yet broader application because it can also easily and dynamically change the rules in the filter for any peer, including a peer with a fixed IP address, not just for an ISP subscriber. Hence, the dynamic filter provides better access control that may be tailored to a specific peer's security needs and easily accommodates changes in those security needs. Thus, the novel utility of a dynamic filter derives from its ability to accommodate and implement frequently changing local rule bases.

An exemplary embodiment of a dynamic filter operates by receiving a packet and searching a pre-global rule base for matching rules. If no matching global pre-rules are found, a local rule base is searched using hash tables for matching local rules. If no matching local rules are found, then a global post-rule base is searched for matching rules. If no matching global post-rules are found, then a default rule is applied if it matches the packet. If the default rule does not match the packet, then an error condition is generated. When any matching rule is found, and the rule's action is DROP, the packet is dropped and no further rules are searched.

Searching rule bases for matching rules consumes both time and processor power. Hash tables for the local rule base in the dynamic filter improve the efficiency of the search process substantially. However, the dynamic filter must perform a hash function and carry out a search of the rule bases for each packet the filter receives. This involves substantial and unnecessary redundancy, because all of the packets in a particular message generally have the same 5-tuple.

For example, suppose data file A is broken into 320 packets for transmission from host A through host A port 20 to host B through host B port 21 using protocol X. The header for each of the 320 packets will comprise the 5-tuple:

A,20,B,21,X

When the first of such packets arrive at the dynamic filter, the filter searches the rule bases for matching rules and applies them. When the next packet arrives, it again carries out the same search, finds the matching rules, and applies them.

A known solution to this problem is to keep a short list (known as a "cache") of rules for recently processed packets that have been derived from the filter rule base. Each rule in the cache stores a cache entry comprising a key (such as a 5-tuple) and action derived from a full-scale search of the filter rule bases for the first packet received in a given message. When a packet is received, the cache is searched first for a matching entry (i.e., for an entry whose key matches the received packet identification data.) This is more efficient than searching the rule bases for subsequent packets in the same message that have the same key. If a cache entry matches, the action of the entry is carried out on the packet without having to search the rule bases. In other words, subsequent packets essentially benefit from the search done for the first packet in the message. This saves processor time and increases the throughput of the filter.

It should be noted that this known caching technique is designed for traditional, static filters with rule bases that are fixed and do not change. This technique cannot be used effectively with a cache for a dynamic filter whose local rule bases change frequently. This is because this known technique provides no way of tracking and ensuring the currency of a cache entry. In other words, a rule from which an entry is derived in a dynamic filter may change frequently. Known caching techniques cannot ensure that outdated entries are not applied to packets. Traditional filter caches are completely emptied whenever there is a rare change in the underlying rule base, and is subsequently reconstructed in accordance with the new rule bases as packets are received and filtered. This is inefficient because the cache is flushed even if the vast majority of cache rules unaffected by the rule change and are still valid, and is only acceptable because such rule changes occur so infrequently in traditional static filters.

Emptying a cache for a dynamic filter every time the rule bases changes would be unacceptably inefficient because the local rule bases change so frequently. A known cache implemented on a dynamic filter would have to be rebuilt so often that it would bring few, if any, advantages in efficiency to the filter.

SUMMARY OF THE INVENTION

The present invention, termed a "session cache," tracks cache rule versions and dynamic filter rule versions in such a way that outdated cache rules are detected, deleted from memory ("ejected") and replaced upon being called upon and before being applied to a packet, while rules unaffected by a change in a local rule base are left intact in the cache.

Each rule in the session cache, called a session entry, is derived from the results of a search of the dynamic filter rule base used to determine the action to be taken with respect to a given packet. For example, the results of a rule base search may indicate that for a packet with a given key (e.g., 5-tuple), the DROP action is to be carried out. The 5-tuple is then added to the cache as a part of a session entry called a "session key." The DROP action is stored as the action corresponding to the session key.

The local rule base in a dynamic filter changes as peers' local rules are added to and ejected from the filter. When the local rule base from which a session entry has been derived changes, the session entry derived from the ejected filter rule base becomes outdated.

The present invention advantageously provides a version tracking system that checks the currency of each session entry that matches the identification data of a packet (e.g., a packet 5-tuple) against the current version of the rule base from which it is derived before it is applied to the packet. If the session entry is up-to-date, the rule is applied. If the session entry is outdated, it is ejected and the filter rule bases are searched for matching rules. The result of the search is stored in the session cache, replacing the outdated rule.

In accordance with the present invention, each filter local rule base has a version number that is incremented each time it is loaded. Each session entry has a session entry version number that is copied from the filter local rule base version number each time the session entry is derived. In accordance with the present invention, when the 5-tuple of a packet matches the session key of a session entry, the session entry version number is checked against the version number of the local rule base from which the rule is derived. If they are the same, the session entry is current, and its action is applied to the packet. If they do not match, the session entry is outdated and ejected from the session cache. The rule bases are then searched for rules that match the packet.

The present invention is further provided with a rule flag for each session entry that identifies the filter rule bases from which the session entry is derived.

The rule flag may indicate that the session entry was derived from a global pre-rule base or a global post-rule base of the filter. In like manner to the local rule base version number, each global rule base has a version number, preferably a time or date-time stamp derived when the global rule base was loaded.

When the version number of a session entry does not match the global rule base from which the entry was derived, the entire session cache is deleted ("flushed"). Because global rule bases are so static, a session cache is rarely flushed due to a change in a global rule base.

If the rule flag indicates that the session entry is derived from a local rule base, each of which comprises a peer-in and a peer-out rule base, then the session version number is checked against the appropriate local rule base version number. If the pertinent version numbers match, the session entry is applied. If a session version number does not match the local rule base version number, the session entry is ejected and a new search is carried out.

In accordance with the present invention, outdated session cache rules are advantageously and efficiently ejected and replaced only when called upon (i.e., when found to match a packet 5-tuple) and found to be outdated. This is far more efficient than the known process of flushing the entire cache whenever any change to the rule bases is effectuated. In accordance with the present invention, a change in a local rule base effects only the corresponding rules in the session cache. Session entries unaffected by a local rule base change are still valid and are advantageously retained. Hence, they need not be re-derived as with known caches, thus saving processor time and filter resources. This is of critical importance for a dynamic filter whose local rule bases change frequently.

In summary, each session entry comprises a session key, an action, session version numbers for each local rule base from which the session entry is derived, and a rule flag.

In accordance with the present invention, the session cache is searched when the filter receives a packet for a session entry whose 5-tuple matches that of the packet. If a matching session entry found, the rule flag identifies rule bases from which the session entry is derived. If the flag identifies local rule bases, the appropriate local rule base version number is checked against the session entry version number. If the session version number matches the pertinent rule base version number, then the session entry action is carried out. If the session version number does not match the pertinent rule base version number, then the session entry is ejected from the session cache, and the filter rule bases are searched for matching rules.

Likewise, if no matching session key is found, then the rule bases are searched for matching rules. The prescribed action for the packet resulting from the rule base search is then added to the session cache along with the session key (equal to the packet 5-tuple), rule base version numbers and an updated rule flag. Together, these elements comprise a session entry. Finally, the prescribed action is carried out on the packet. Thus, valid rules are not flushed from the cache in accordance with the present invention, saving processor time and improving filter efficiency.

BRIEF DESCRIPTION OF THE DRAWINGS

FIG. 1 shows a prior art embodiment of a filter between two networks.

FIG. 2 shows a session cache in accordance with the present invention.

FIG. 3 shows a session entry in accordance with the present invention.

FIG. 4 shows a filter rule base version table in accordance with the present invention.

DETAILED DESCRIPTION

As shown in FIG. 2, the session cache 21 in accordance with the present invention contains at least one session entry 22. Each session entry 22 comprises a session key 23, a session action 24, and a session entry version number 25 matching the local rule base version number from which the session entry was derived. Another embodiment of the present invention may include a session entry version number that corresponds to the global rule base from which the entry was derived. Each session entry also has a rule flag 26 that indicates from which filter rule bases the session entry has been derived. For example, the rule flag indicates whether the session entry was derived from the global pre-rule base, a particular local rule base, or the global post-rule base.

An embodiment of the rule flag data structure is as follows:

```
pf_from_rulebase_flags
{
    flag from_global_pre_rulebase
    flag from_global_post_rulebase
    flag from_source_peer_rulebase
    flag from_destination_peer_rulebase
}
```
An embodiment of a session key data structure is shown as follows:
```
pf_session_key
{
    ip_address      source_address
    ip_address      dest_address
    ip_port     source_port
    ip_port     dest_port
    ip_protocol     protocol
}
```
An embodiment of the data structure for a session entry is as follows:
```
pf_session
{
    pf_session_key key    // this is the 5-tuple
    pf_action action      // PASS or DROP
    pf_from_rulebase_flags rulebase_flags   // from
                                            which rule
                                            base entry
                                            was derived
    integer  global_pre_rulebase_version    // session
                                            entry
                                            version
                                            numbers
```

-continued

```
    integer    global_post_rulebase_version
    integer    src_peer_rulebase_version
    integer    dst_peer_rulebase_version
}
```

Here, the local rule base version numbers are logically divided in accordance with the present invention into peer-in and peer-out version numbers. The pf_session structure describes a single entry in the session cache. A session cache consists of an array of pf_session structures depending on the number of active sessions at that particular time.

An embodiment of a session entry in accordance with the present invention is shown in FIG. 3. The session entry 311 has a session key 312 that is a 5-tuple comprising a network source address 313, a source port 314, a network destination address 315, a destination port 316, and a protocol identifier 317. The session entry 311 also has a DROP session action 318, and a session entry version number 319. The session entry rule flag 325 has a single bit for a global pre-rule base 321, a bit for a peer-in rule base 322, a bit for a peer-out rule base 323, and a bit for a global post-rule base 324. A "0" indicates that session entry is not derived from the pertinent rule base, while a "1" indicates that it is derived from that rule base.

In accordance with the present invention, when a packet is received, the session cache is searched for a session entry whose 5-tuple matches that of the packet. If a matching rule is found, then the rule flag is used to identify from which filter rule bases the matching session entry was derived.

A pseudo-code embodiment of this process is shown as follows:

```
stage1_processing()
{
    Extract the IP header info from the packet as
described by the structure pf_session_key.
    Get the index into the pf_session_hash_table by
hashing.
    Look for a match for the contents of pf_session_key
with any of the pf_session_key entries
        located in this particular hash bucket.
        if (match && version nos in the corresponding rule-
        bases equal to the ones in pf_session)
        {
            proceed with the action field in the pf_session
structure.
            return
        }
        if (match && version nos are not equal)
        {
            delete the pf_session entry from the
session_cache.
        }
        proceed to stage 2.
}
```

Here, Stage1_processing( ) refers to the method used when there is a session entry whose session key matches the packet 5-tuple. Stage 2 is carried out when no such matching session entry is found.

In the present embodiment shown in FIG. 3, a packet with the 5-tuple A,20,B,21,3 is found to match the session entry. The rule flag 325 (0100) indicates that the rule was derived from a peer-in rule base.

In accordance with the present invention, a rule base version tables are maintained in the filter. An embodiment of a data structure for such a table is as follows:

| Hash Index | Session Pointer |
|---|---|
| 1 | pf_session * |
| 2 | pf_session * |
| 3 | pf_session * |
| 4 | pf_session * |

The pf_session_hash_table describes all of the active sessions in the session cache. A hash function is evaluated on the pf_session structure to produce an index value for the table. A pointer to the pf_session structure is then placed into the pf_session_hash_table array at the index location.

An embodiment of such a version table for a local rule base is shown in FIG. 4 as 41. When a peer's local rule base is loaded into the filter, a hash function h is carried out on the peer's network address. In FIG. 4, h(A) 42 represents the result of hash function h carried out on a peer with network address A. Next, a version number is associated with the hashed peer network address. A preferred embodiment of the version number is a date-time stamp generated when the peer's local rule base was loaded. Thus, in FIG. 4, version number 09091532(43), signifying that the rule base was loaded on September 9 at 3:32 P.M., is associated with h(A). Each time a rule base for a given peer is loaded, the version number in the version table is updated with a new date-time stamp. Thus, when peer A is no longer authenticated, version 09091532 of its local rule base will be ejected from the filter. When it is later authenticated again and its local rule base is loaded, a new version number corresponding to the date and time at which it was loaded will be associated with h(A) 42.

If the matching session entry was derived from the global pre-rule base or the global post-rule base, then the session entry version number is compared to the rule base version number in the version table. If the two are different, the session cache is flushed. This does not significantly impair the efficiency of the present invention, because the global rule bases are relatively static, being changed infrequently, especially in comparison to the local rule bases, i.e., the peer-in and peer-out rule bases.

If the flag indicates that the matching session entry was derived from either the peer-in or peer-out rule bases, then the matching session entry version numbers are checked against the relevant local rule base version number stored in the version table.

In accordance with the present invention, it is possible to determine from which rule base the session entry was derived simply by knowing the rule flag and the 5-tuple of the matching packet. This is illustrated in the case of the present embodiment as follows.

The rule flag 322 indicates that the session entry of the present embodiment was derived from a peer-in rule base. This indicates that the applicable filter rule regulates the flow of information directed towards a protected peer. From the matching packet 5-tuple, it can be seen that the matching packet is directed to a peer with network address B. Thus, the session entry was derived from a peer-in rule from peer B's local rule base. A hash function is carried out on the network destination address of the packet, yielding h(B). The version number to which h(B) points in the version table is 2. This matches the peer-in version number stored as the session entry peer-in version number 319 (FIG. 3). Hence, the DROP action of the session entry shown in FIG. 3 is carried out on the packet.

If any session entry version number does not match its corresponding filter local rule base version number, then the session entry is outdated and is ejected from the cache and the filter rule bases are searched.

For example, suppose the rule flag in the embodiment shown in FIG. 3 were 0010, indicating that the session entry was derived from the peer-out rule base, which regulates the flow of packets from a protected peer. Therefore, the packet network source address indicates the peer whose local rule base was used to derive the session entry. Hash function h is carried out on packet network source address A, and the version table is checked for the version number to which h(A) points. As shown in FIG. 3, h(A) corresponds to version number 3. Suppose the local rule base version number stored in the session entry shown in FIG. 3 were 1. This would indicate that the peer A rule base had been updated twice since the session entry of FIG. 3 was derived from the rule base. Hence, the rule is outdated and is ejected. Then the filter rule bases are searched. The filter rule bases are searched if a packet is received and no matching session entry is found in the session cache, or if a matching rule is found to be outdated and is ejected. In one filter embodiment, a global pre-rule base is first searched. If a matching rule is found, the session key of the packet and the rule action is added to the session cache, the session entry flag is set, the version number is stored, and the rule action is carried out. If no matching rule is found, the peer-in and peer-out rules are searched.

If at least one matching peer-in and/or peer-out rule is found whose action is DROP, the packet session key and a DROP action is stored as a session entry along with the rule base version numbers in the session cache. The rule flag is also updated.

If all matching peer-in and peer-out rules are PASS, then the packet session key and a PASS action is stored as a session entry along with the rule base version number in the session cache. The rule flag is also updated.

If no matching peer-in or peer-out rules are found, then the global post-rule base is searched. If a matching rule is found, then the packet session key and the matching rule action is stored as a session entry in the session cache along with the rule base version number. The rule flag is also updated.

A default rule is part of the global post-rule base. If no other rules match the packet, then the packet is checked against the default rule. If it matches, the default rule action is carried out on the packet. If it does not match, an error condition is generated.

A pseudo-code embodiment for searching the rule base is shown as follows:

```
stage2_processing(pf_session_key *pkt)
{
    global_pre_rule =
search_rulebase(pf_global_pre_rulebase, pkt)
    if (global_pre_rule)
    {
        update_session_entry(pkt)
        perform_action(global_pre_rule—>action)
        return
    }
    source_hash_indx = hash (pkt—>source_address)
    dest_hash_indx = hash (pkt—>dest_address)
    source_peer = find_peer (source_hash_indx)
    dest_peer = find_peer (dest_hash_indx)
    if (source_peer)
    {
        source_peer_rule = search_rulebase (source_peer—
>out_rulebase, pkt)
    }
```

-continued

```
    if (dest_peer)
    {
        dest_peer_rule = search_rulebase (dest_peer—
>in_rulebase, pkt)
    }
    if (source_peer_rule && source_peer_rule—>action ==
DROP)
    {
        update_session_entry(pkt)
        perform_action(source_peer_rule—>action)
        return
    }
    if (dest_peer_rule && dest_peer_rule—>action == DROP)
    {
        update_session_entry(pkt)
        perform_action(dest_peer_rule—>action)
        return
    }
    if (source_peer_rule && dest_peer_rules &&
source_peer_rule—>action == PASS && dest_peer_rule—>action
== PASS)
    {
        update_session_entry(pkt)
        perform_action(source_peer_rule—>action)
        return
    }
    if (source_peer_rule && !dest_peer_rule &&
source_peer_rule—>action==PASS)
    {
        update_session_entry(pkt)
        perform_action(source_peer_rule—>action)
        return
    }
    if (!source_peer_rule && dest_peer_rule &&
dest_peer_rule—>action==PASS)
    {
        update_session_entry(pkt)
        perform_action(dest_peer_rule—>action)
        return
    }
    global_post_rule =
search_rulebase(pf_global_pre_rulebase, pkt)
    if (global_post_rule)
    {
        update_session_entry(pkt)
        perform_action(global_post_rule—>action)
        return
    }
    else
    {
        /* ERROR */
```

The session cache with version tracking in accordance with the present invention advantageously retains valid rules in the session cache that are not affected by changes in the local rule bases stored in the dynamic filter. This reduces the burden on the filter processor, increasing throughput and improving its efficiency.

What is claimed is:

1. A method for providing peer-level access control on a network that carries packets of information having packet identification data, said method using a dynamic filter having a cache that stores a cache entry having a cache key, a cache version number, a cache action and a rule base indicator, the cache entry derived from at least one rule having a rule key and rule action in at least one rule base, said method comprising:

a. receiving a packet;
   b. searching the cache to identify a cache entry having a cache key that corresponds to the identification data of the received packet;
   c. if a corresponding cache entry is identified and if the rule base indicator of the cache entry indicates that the cache entry was derived from a rule base having associated therewith a rule base version number;

i. determining if the cache entry version number corresponds to the version number of the rule base from which the cache entry was derived;
   ii. if the cache entry version number does not correspond to the version number of the rule base from which the cache entry was derived, searching at least one rule base of the filter to identify a corresponding rule that corresponds to the identification data of the received packet;
   iii. if a corresponding rule is identified, carrying out the action of the corresponding rule; and
   iv. storing a cache entry derived from the corresponding rule, the cache entry comprising the identification data of the received packet, the action prescribed by the corresponding rule and carried out on said packet in step iii, and a rule base indicator that indicates the rule base of the corresponding rule from which the cache entry was derived.

2. The method of claim 1, further comprising the step of:
   v. if a rule base version number is associated with the rule base of the corresponding rule, storing the rule base version number as the cache entry version number of the cache entry of step iv.

3. A method for providing peer-level access control on a network that carries packets of information having packet identification data, said method using a dynamic filter having a cache that stores a cache entry having a cache key, a cache version number, a cache action and a rule base indicator, the cache entry derived from at least one rule having a rule key and rule action in at least one rule base, said method comprising:
   a. receiving a packet;
   b. searching the cache to identify a cache entry having a cache key that corresponds to the identification data of the received packet;
   c. if a corresponding cache entry is identified and if the rule base indicator of the cache entry indicates that the cache entry was derived from a rule base having associated therewith a rule base version number;
      i. determining if the cache entry version number corresponds to the version number of the rule base from which the cache entry was derived,
wherein if a corresponding cache entry is identified and if the rule base indicator indicates that the cache entry was derived from a rule of a global rule base, further comprising the steps of:
      A. determining if the cache entry version number corresponds to the global rule base version number of the global rule base of the rule from which the cache entry was derived;
      B. deleting all cache entries from the cache if the cache entry version number does not correspond to the global rule base version number.

4. The method of claim 3, further comprising the step of:
   iii carrying out the cache action of the cache entry if the cache entry version number corresponds to the global rule base version number.

5. A cache for a dynamic filter, the dynamic filter including a rule in a rule base, said cache having a cache entry, said cache comprising:
   a. means for receiving a packet having identification data;
   b. means for searching said cache to identify a cache entry that corresponds to the identification data of the received packet;
   c. means for carrying out a first action on the received packet as prescribed by a corresponding cache entry of step b whose version number corresponds to the version number of the rule base from which the cache entry was derived;
   d. means for carrying out a second action on the received packet as prescribed by a rule that corresponds to the identification data of the received packet if there is no corresponding cache entry or if the version number of the cache entry does not correspond to the version number of the rule base from which the rule was derived;
   e. means for storing a cache entry, the cache entry comprising the identification data of the received packet, the action carried out on said packet in step d, and a rule base indicator that indicates from which rule base the cache entry was derived; and
   f. means for storing a rule base version number as the cache entry version number of the cache entry of step e, if a rule base version number is associated with the rule base of the rule from which the cache entry was derived.

6. A computer readable medium having a computer program encoded thereon, comprising:
   a. a first portion of said medium having a first program segment for receiving a packet having identification data over a computer network;
   b. a second portion of said medium having a second program segment for searching a cache to identify a cache entry having a cache key that corresponds to the identification data of the received packet;
   c. a third portion of said medium having a third program segment for determining if the cache entry version number of a corresponding cache entry identified by said second portion corresponds to the version number of the rule base from which the cache entry was derived;
   d. a fourth portion of said medium having a fourth program segment for carrying out the action of a corresponding cache entry whose cache key corresponds to the identification data of the received packet and whose cache entry version number corresponds to the version number of the rule base from which the cache entry was derived;
   e. a fifth portion of said medium having a fifth program segment for searching a filter rule base to identify a rule having a rule key that corresponds to the identification data of the received packet if no corresponding cache entry was identified, or if the cache entry version number of a corresponding cache entry does not correspond to the version number of the rule base from which the cache entry was derived;
   f. a sixth portion of said medium having a sixth program segment for carrying out the action of a corresponding rule identified by said fifth segment of said medium;
   g. a seventh portion of said medium having a seventh program segment for storing a cache entry comprising the identification data of the received packet, the action prescribed by a corresponding rule and carried out by said sixth portion of said medium, and a rule base indicator indicating the rule base of the corresponding rule from which the cache entry was derived; and
   h. an eighth portion of said medium having an eighth program segment for deleting a cache entry from the cache when the cache entry version number does not correspond to the version number of the rule base from which the cache entry was derived.

* * * * *